(12) United States Patent
Adams et al.

(10) Patent No.: US 9,460,281 B2
(45) Date of Patent: Oct. 4, 2016

(54) METHOD OF SECURING NON-NATIVE CODE

(75) Inventors: Garney David Adams, Stittsville (CA); Yuan Xiang Gu, Ottawa (CA); Jack Jiequn Rong, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 262 days.

(21) Appl. No.: 14/008,384

(22) PCT Filed: Mar. 31, 2011

(86) PCT No.: PCT/CA2011/050173
§ 371 (c)(1),
(2), (4) Date: Sep. 27, 2013

(87) PCT Pub. No.: WO2012/129639
PCT Pub. Date: Oct. 4, 2012

(65) Prior Publication Data
US 2014/0026214 A1    Jan. 23, 2014

(51) Int. Cl.
*G06F 11/00* (2006.01)
*G06F 12/14* (2006.01)
*G06F 12/16* (2006.01)
(Continued)

(52) U.S. Cl.
CPC ........... *G06F 21/51* (2013.01); *G06F 9/45558* (2013.01); *G06F 21/52* (2013.01); *G06F 21/53* (2013.01); *G06F 21/54* (2013.01); *G06F 9/3017* (2013.01); *G06F 9/30174* (2013.01); *G06F 9/3879* (2013.01); *G06F 9/45516* (2013.01); *G06F 2009/45587* (2013.01)

(58) Field of Classification Search
CPC .... G06F 21/51; G06F 21/52; G06F 9/45516; G06F 9/3017; G06F 9/30174; G06F 9/3879

USPC .......................................................... 726/22
See application file for complete search history.

(56) References Cited

U.S. PATENT DOCUMENTS 5,898,850 A * 4/1999 Dickol ................ G06F 9/30174
712/229
5,898,885 A * 4/1999 Dickol ................ G06F 9/30134
711/118
(Continued)

FOREIGN PATENT DOCUMENTS

WO    2010053953 A2    5/2010
WO    2010054235 A2    5/2010

OTHER PUBLICATIONS

International Search Report and Written Opinion dated Dec. 19, 2011.
(Continued)

*Primary Examiner* — Jayesh Jhaveri
(74) *Attorney, Agent, or Firm* — Marc S. Kaufman; Reed Smith LLP

(57) ABSTRACT

A method to secure a non-native application. The non-native application is processed to obtain an application stub to be triggered within a virtual machine. The processing of the non-native application also provide a native code function upon which the application stub depends. The non-native function is part of a trusted module that extends security services from the trusted module to the virtual machine. The trusted module is a native code application that creates a trusted zone as a root of trustiness extending to the virtual machine by an execution-enabling mechanism between the application tab and the non-native function.

22 Claims, 7 Drawing Sheets

(51) Int. Cl.
  *G08B 23/00* (2006.01)
  *G06F 21/51* (2013.01)
  *G06F 21/54* (2013.01)
  *G06F 21/53* (2013.01)
  *G06F 21/52* (2013.01)
  *G06F 9/30* (2006.01)
  *G06F 9/38* (2006.01)
  *G06F 9/455* (2006.01)

(56) References Cited

U.S. PATENT DOCUMENTS

| | | | | |
|---|---|---|---|---|
| 6,199,095 | B1* | 3/2001 | Robinson | G06F 9/45504 718/107 |
| 6,779,114 | B1* | 8/2004 | Gu | G06F 21/14 713/189 |
| 7,661,140 | B2* | 2/2010 | Little | G06F 12/0253 707/813 |
| 8,468,600 | B1* | 6/2013 | Kaskel | G06F 21/53 726/22 |
| 8,528,083 | B2* | 9/2013 | Lewis | G06F 21/53 719/328 |
| 9,213,826 | B2* | 12/2015 | Gu | G06F 21/51 |
| 2004/0015911 | A1* | 1/2004 | Hinsley | G06F 8/47 717/147 |
| 2005/0102129 | A1 | 5/2005 | Bond et al. | |
| 2005/0114683 | A1* | 5/2005 | Jin | G06F 21/6218 713/187 |
| 2005/0172299 | A1 | 8/2005 | Zhao et al. | |
| 2006/0117305 | A1* | 6/2006 | Tarkkala | G06F 9/45508 717/139 |
| 2006/0190934 | A1* | 8/2006 | Kielstra | G06F 9/45516 717/148 |
| 2007/0180509 | A1* | 8/2007 | Swartz | G06F 9/4406 726/9 |
| 2009/0172657 | A1 | 7/2009 | Makelainen et al. | |
| 2009/0210874 | A1* | 8/2009 | Harris | G06F 9/4552 718/1 |
| 2009/0217349 | A1* | 8/2009 | Terashita | G06F 21/608 726/2 |
| 2009/0282474 | A1* | 11/2009 | Chen | G06F 21/53 726/21 |
| 2010/0118038 | A1 | 5/2010 | Labour et al. | |
| 2010/0122271 | A1* | 5/2010 | Labour | G06F 9/44526 719/328 |
| 2010/0257539 | A1* | 10/2010 | Narayanan | G06F 9/44526 719/311 |
| 2010/0306759 | A1* | 12/2010 | Kohler | G06F 9/45504 717/174 |
| 2011/0029961 | A1* | 2/2011 | Muth | G06F 21/52 717/154 |

OTHER PUBLICATIONS

European Search Report in corresponding European Application No. 11862317.2 dated Jul. 15, 2014.

* cited by examiner

METHOD OF SECURING NON-NATIVE CODE

FIELD

The present disclosure relates generally to security in software applications. More particularly, the present disclosure relates to securing non-native applications that are executed in a virtual machine.

BACKGROUND

Virtual machines and script interpreters are known. Software applications designed for execution by a process virtual machine, or a script interpreter, are shielded from the underlying hardware and operating system of the computing platform on which they run. As such, these applications, which can be referred to as non-native applications, cannot access the security resources provided by the computing platform and, cannot use protective measures available to native applications. Additionally, many established software security and protection techniques, which are designed to protect native code (e.g., machine code), cannot be directly adapted to process non-native applications. Security approaches that provide restricted protection of a computing system (e.g., sandbox security), within which a non-native application can run, may limit this adaptation capability even further. As such, process virtual machines or script interpreters are fundamentally un-trusted and vulnerable to attacks.

In recent years, tablet computers and smart phones have been the subject of exceptional growth, as have the number of software applications available to them. Many such software applications are non-native applications that have little computing platform dependency. As an example, some applications for tablet computers and smart phones can be loaded, triggered and run within a web browser that cannot provide a native environment and acceptable security.

Therefore, improvements in protection and security of non-native applications that run on virtual machines and script interpreters are desirable.

SUMMARY

In a first aspect, the present disclosure provides a method to secure execution of a non-native application coded in non-native code. The method comprises: modifying the non-native application to obtain a native code function and an application stub, the native code function being executable within a pre-defined trusted module, the pre-defined trusted module having one or more native environment security functions, the application stub having at least one execution dependency dependent on the native code function, the at least one execution dependency including a call to the native code function. The method further comprises packaging the application stub with the native code function.

The method can further comprise: loading the application stub within a non-native environment; loading the native code function within the pre-defined trusted module; and executing the application stub in the non-native environment, the at least one execution dependency causing the application stub to call the native code function to cause the native code function to be executed within the pre-defined trusted module in accordance with at least one of the one or more native environment security functions.

The non-native application can include a non-native code function, and modifying the non-native application can include converting the non-native code function into a counterpart native code function.

The non-native application can includes a non-native code function with a non-native code function functionality; modifying the non-native application can include converting the non-native code function into partial non-native code functions, and installing the partial non-native code functions in the non-native application stub; and the native code function can includes one or more bridge functions to bridge the partial non-native code functions to obtain bridged partial non-native code functions, the bridged partial non-native code functions having a functionality equivalent to that of the non-native code function.

The non-native application can include a non-native code function with a non-native code function functionality; modifying the non-native application can include converting the non-native code function into partial non-native code functions, installing a first portion of the partial non-native code functions in the non-native application stub, and installing a second portion of the partial non-native code functions in an application library, the application library being encompassed within the pre-defined trusted module; and the native code function can include one or more bridge functions to bridge the first and second portions of the partial non-native code functions to obtain bridged partial non-native code functions, the bridged partial non-native code functions having a functionality equivalent to that of the non-native code function.

The non-native application can include a non-native code function with a non-native code function functionality; modifying the non-native application can include converting the non-native code function into at least one partial non-native code function and at least one partial native code function, the at least one partial non-native code function being part of the non-native application stub; and the native code function can include one or more bridge functions to bridge the at least one partial non-native code function and the at least one partial native code function to obtain bridged partial native and non-native code functions, the bridged partial native and non-native code functions having a functionality equivalent to that of the non-native code function.

The non-native application can include a plurality of non-native code functions having an overall functionality; modifying the non-native application can include installing the plurality of non-native code functions in the non-native application stub; and the native code function can include one or more bridge functions to bridge the plurality of non-native code functions to obtain bridged non-native code functions, the bridged non-native code functions having a functionality equivalent to that of the overall functionality of the plurality of non-native code functions.

The non-native application stub can include a secure loader stub and the one or more native environment security functions can include a secure loader handler function.

The non-native application stub can include an integrity verification stub and the one or more native environment security functions can include an integrity verification handler function.

The one or more native environment security functions can include an anti-debug handler.

The non-native application can include a non-native code function with a non-native code function functionality; and modifying the non-native application can include: converting the non-native code function into partial non-native code functions, the partial non-native code functions having a first portion of partial non-native code functions and a second portion of partial non-native code functions; and installing the first portion of the partial non-native code functions in the non-native application stub; the method can further comprise: encrypting the second portion of the partial non-native code functions to obtain encrypted partial non-native code functions; and installing the encrypted partial non-native code functions in an application library, the application library being encompassed within the pre-defined trusted module, the encrypted partial non-native code functions to be decrypted at run-time to obtain a decrypted second portion of the partial non-native code functions, the decrypted second portion of the partial non-native code functions to be loaded in the non-native environment, the native code function including one or more bridge functions to bridge the first portion of the partial non-native code functions and the decrypted second portion of the partial non-native code functions to obtain bridged partial non-native code functions, the bridged partial non-native code functions having a functionality equivalent to that of the non-native code function.

The non-native code can includes at least one of Java code, Javascript code, C# code, Actionscript code, and Python code.

The call to the native code function can be done through a Java Native Interface.

The call to the native code function can done through a Netscape Plugin Application Programming Interface.

Other aspects and features of the present disclosure will become apparent to those ordinarily skilled in the art upon review of the following description of specific embodiments of the present disclosure in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Generally, the present disclosure provides a method to secure a non-native application. The non-native application is processed to obtain an application stub to be triggered within a virtual machine. The processing of the non-native application also provides a native-code function upon which the application stub depends. Upon triggering of the application stub, the application stub makes a function call the native-code function. The non-native function is part of a trusted module that extends security services from the trusted module to the virtual machine. The trusted module is a native-code application that creates a trusted zone as a root of trustiness extending to the virtual machine by an execution-enabling mechanism between the non-native application stub and the non-native function.

In order to securely connect to the trusted module, certain embodiments of the present disclosure extend the virtual machine execution environment and enable the virtual machine application to use the security services provided by the trusted module, as well as enabling the trusted module to access the virtual machine in support of security related features. A virtual lock can be established to bind the virtual machine (non-native) application to the trusted module. The virtual lock provides execution interlocking between applications running on the virtual machine and the trusted module, and ensures that the applications are unable to run without the trusted module. Once the interlocking is established, the trustworthiness of the trusted module can be extended to the virtual machine application. Security features can vary based on the virtual machine application and on the virtual machine implementation.

The trusted module can support a wide range of virtual machine implementations each with a potentially different instruction set architecture. Certain embodiments of the trusted module provide a number of basic security features that protect applications in a virtual machine or in a scripting engine.

Figure 1:
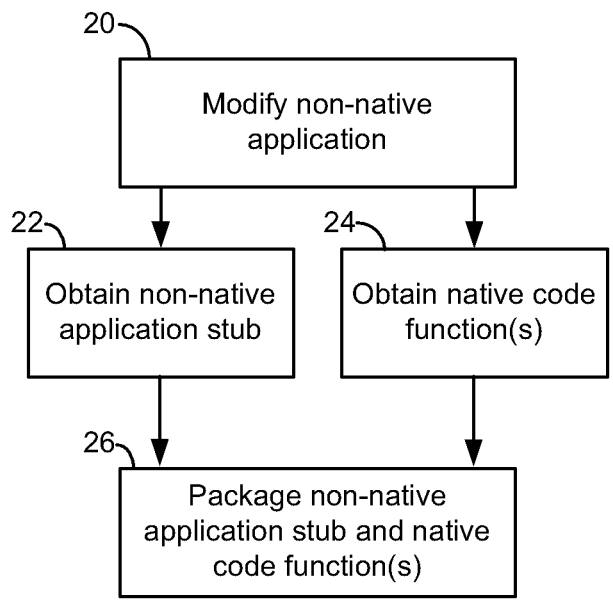
FIG. 1 show a embodiment of a provisioning process flow of the present disclosure.

FIG. 1 shows an embodiment of a method of the present disclosure. The method of FIG. 1 shows how a non-native application can be modified to be more secure through execution dependencies on one or more than one native-code functions. The non-native application to be modified is coded in non-native code and can be, for example, a non-native application designed to work on a virtual machine. At action 20, the non-native application is modified to obtain, at action 22, a non-native application stub and, at action 24, a native code function or more than one native code function (native code function(s)). As will be described in more detail below, the non-native application stub has at least one execution dependency that is dependent on at least one of the native code function(s); such an execution dependency can include a call to the native code function(s). At action 26, the non-native application stub obtained at action 22, and the native code function(s) obtained at action 26, are packaged for distribution. As stated above, the non-native application stub obtained at action 22 is dependent, at execution, on the native code function(s) obtained at action 24. Because the non-native application stub is dependent, at execution, on the native code function(s), the non-native application stub and the native code function(s) can be said to be interlocked.

Figure 2:
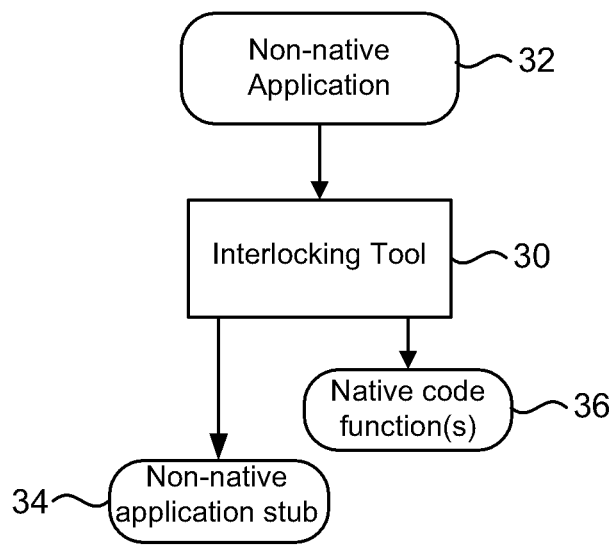
FIG. 2 shows a functionality of an interlocking tool embodiment of the present disclosure.

FIG. 2 shows an embodiment of an interlocking tool 30 that can be used to perform the method of FIG. 1. As shown at FIG. 2, a non-native application 32 is input into the interlocking tool 30, which processes (modifies) the non-native application 32 and outputs a non-native application stub 34 and native code function(s) 36 (one native code function or more than one native code functions). The non-native application stub 34 is dependent, at execution, on the native code function(s) 36. As such, the non-native application stub 34 and the native code function 36 are interlocked. The native code function(s) 36 can be made part of a application library, which can contain native functions and non-native functions.

The non-native application stub 34 and the native code function(s) 36 will have, at runtime, the equivalent functionality of the original non-native application 32. As will be described in more detail below, the interlocking tool 30 can add non-native application functions to the application stub 34 that call the native code function(s) 36. As a result of the modification of the non-native application 32, the non-native application stub 34 will not provide complete functionality of the non-native application 32 without the native code function(s) 36.

Figure 3:
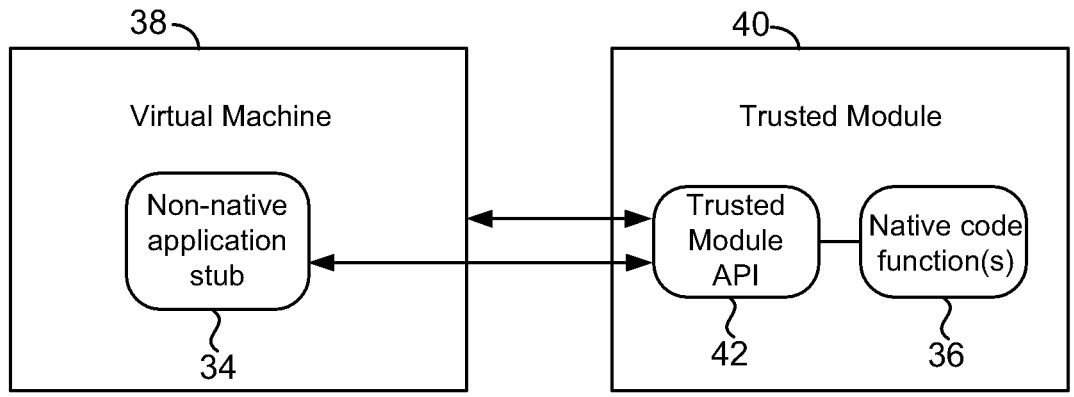
FIG. 3 shows a runtime representation of an embodiment of the present disclosure.

FIG. 3 shows the non-native application stub 34 and the native-code function(s) 36 at runtime. The non-native application stub 34 is shown within a virtual machine 38 and the native code function(s) 36 within a trusted module 40. The trusted module 40 also encompasses a trusted module application program interface (API) 42. Calls to the trusted module API 42 can be triggered by the virtual machine 38 and by the non-native application stub 34. The trusted module 40 is pre-defined and can be implemented in C/C++, assembly languages or in any other suitable programming language. Because implementation of the inventive security modules can be made in such languages, this enables use of native environment security functions that can secure code written in those languages (C/C++, assembly languages or in any other suitable programming language). Suitable native environment security functions can access hardware-based security features to establish the root of trustiness. Moreover, suitable native environment security functions can include, for example, those disclosed in Patent documents including: U.S. Pat. No. 7,506,177 issued on 17 Mar. 2009 to Chow et al. and titled TAMPER RESISTANT SOFTWARE ENCODING AND ANALYSIS; U.S. Pat. No. 7,464,269 issued on 9 Dec. 2008 to Johnson et al. and titled SECURE METHOD AND SYSTEM FOR HANDLING AND DISTRIBUTING DIGITAL MEDIA; U.S. Pat. No. 7,397,916 issued on 8 Jul. 2008 to Johnson et al. and titled SYSTEM AND METHOD FOR PROTECTING COMPUTER SOFTWARE FROM A WHITE BOX ATTACK; U.S. Pat. No. 7,395,433 issued on 1 Jul. 2008 to Chow et al. and titled METHOD AND SYSTEM FOR SUSTAINABLE DIGITAL WATERMARKING; U.S. Pat. No. 7,350,085 issued on 25 Mar. 2008 to Johnson et al. and titled TAMPER RESISTANT SOFTWARE-MASS DATA ENCODING; U.S. Pat. No. 7,325,141 issued on 29 Jan. 2008 to Chow et al. and titled METHOD AND SYSTEM FOR SECURE ACCESS; U.S. Pat. No. 6,842,862 issued on 11 Jan. 2005 to Chow et al. and titled TAMPER RESISTANT SOFTWARE ENCODING; U.S. Pat. No. 6,779,114 issued on 17 Aug. 2004 to Chow et al. and titled TAMPER RESISTANT SOFTWARE-CONTROL FLOW ENCODING; U.S. Pat. No. 6,594,761 issued on 15 Jul. 2003 to Chow et al. and titled TAMPER RESISTANT SOFTWARE ENCODING; U.S. Pat. No. 7,809,135 issued on 5 Oct. 2010 to Johnson et al. and titled SYSTEM AND METHOD FOR PROTECTING COMPUTER SOFTWARE FROM A WHITE BOX ATTACK; U.S. Patent Application Publication No. 2011/0067012 published 17 Mar. 2011 and titled SYSTEM AND METHOD FOR GENERATING WHITE-BOX IMPLEMENTATIONS OF SOFTWARE APPLICATIONS; International Patent Application No. WO2010/127438 published 11 Nov. 2011 and titled INTERLOCKED BINARY PROTECTION USING WHITEBOX CRYPTOGRAPHY; U.S. Pat. No. 7,634,091 issued 27 Jul. 2005 to Zhou et al. and titled SYSTEM AND METHOD OF HIDING CRYPTOGRAPHIC PRIVATE KEYS, International Patent Application No. WO2010/0146140 published 23 Dec. 2010 and titled WHITE-BOX CRYPTOGRAPHIC SYSTEM WITH CONFIGURABLE KEY USING BLOCK SELECTION; International Patent Application No. WO2010/146139 published 23 Dec. 2010 and titled WHITE-BOX CRYPTOGRAPHIC SYSTEM WITH CONFIGURABLE KEY USING INTERMEDIATE DATA MODIFICATION; International Patent Application No. WO2008/142612 published 27 Nov. 2008 and titled UPDATING CRYPTOGRAPHIC KEY DATA; U.S. Patent Application Publication No. 20090254759, published 8 Oct. 2009; U.S. Pat. No. 7,881,466 issued Feb. 1, 2011 to Gorissen et al. and titled METHOD AND SYSTEM FOR OBFUSCATING A CRYPTOGRAPHIC FUNCTION; U.S. Patent Application Publication No. 20100299515 published 25 Nov. 2010 and titled TRACING COPIES OF AN IMPLEMENTATION; International Patent Application No. WO2009/109884 published 11 Sep. 2009 and titled CRYPTOGRAPHIC SYSTEM; U.S. Patent Application Publication No. 20100080395, published 1 Apr. 2010 and titled CRYPTOGRAPHIC METHOD FOR A WHITE-BOX IMPLEMENTATION; International Patent Application No. WO2009/034504 published 19 Mar. 2009 and titled CRYPTOGRAPHIC PROCESSING OF CONTENT; U.S. Pat. No. 7,079,651 issued 18 Jul. 2006 to Boer and titled CRYPTOGRAPHIC METHOD AND APPARATUS FOR NON-LINEARLY MERGING A DATA BLOCK AND A KEY; Chinese Patent Document No. 200880017068.3; U.S. Pat. No. 7,876,898 issued to Gorissen et al. on 25 Jan. 2011 and titled BLOCK CIPHERING SYSTEM, USING PERMUTATIONS TO HIDE THE CORE CIPHERING FUNCTION OF EACH ENCRYPTION ROUND; U.S. Patent Application Publication No. 20090313480 published 17 Dec. 2009 and titled METHOD AND SYSTEM FOR OBFUSCATING A GRYPTOGRAPHIC FUNCTION; International Patent Application No. WO2010/102960 published 16 Sep. 2010 and titled WHITE-BOX CRYPTOGRAPHIC SYSTEM WITH INPUT DEPENDENT ENCODINGS; U.S. Patent Application Publication No. 20090158051 published 18 Jul. 2009 and titled METHOD AND SYSTEM FOR OBFUSCATING A CRYPTOGRAPHIC FUNCTION; International Patent Application No. WO2009/095838 published 6 Aug. 2009 and titled SECURING A SMART CARD; International Patent Application No. WO2009/136361 published 12 Nov. 2009 and titled EXPONENT OBFUSCATION; and International Patent Application No. WO2009/109880 published 11 Nov. 2009 and titled WHITE-BOX IMPLEMENTATION, which are incorporated herein by reference, in their entirety.

Figure 4:
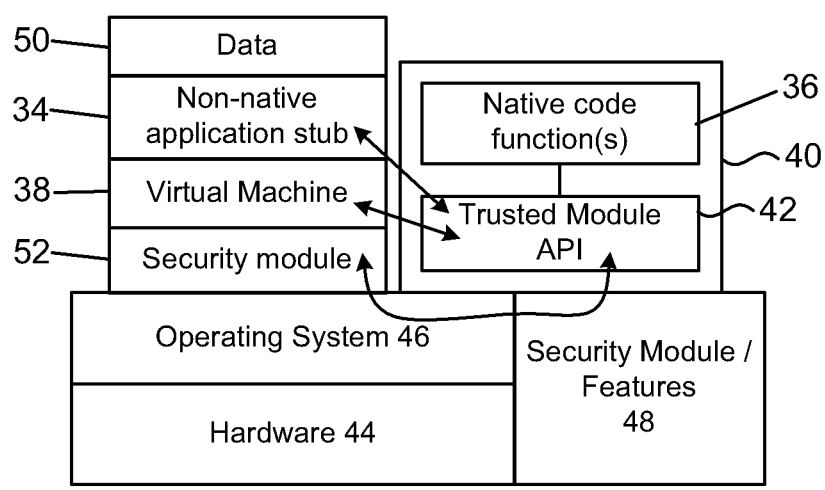
FIG. 4 shows a embodiment of software elements, and their interfaces in accordance with the present disclosure.

FIG. 4 shows an example of various software elements, and their interfaces, layered above a computing platform hardware 44, operating system 46, and security module (security features) 48. The software layers include the trusted module 40, which encompasses the trusted module API 42, and the native code function(s) 36, which can be part of an application library. The software layers also include the virtual machine 38, atop of which the non-native application stub 34 is layered. Any data 50 that may be required by the non-native application stub 34 is layered atop the non-native application stub 34. The virtual machine 38 is layered atop a security module 52, which can establish a connection with the trusted module 40 through the trusted module API 42. The operating system 46 controls the access, by the virtual machine 38, to resources of the computing platform such as, for example, the hardware 44 and possibly the security module (security features) 48, which can include, for example, a smart card, a dongle, a node-locking circuit, etc. The trusted module 40 enables the security module 52 to secure the non-native application stub 34. In the remainder of the disclosure, the term non-native application is used to cover both a virtual machine application and a scripting application (a script).

As disclosed above, it is possible to secure a non-native application 32 by modifying the non-native application 32 to obtain a non-native application stub 34 that has execution dependencies dependent on a native code function(s) 36, and by packaging the non-native application stub 34 and the native code function(s) 36. As will be described below, the functionality of the non-native application 32 can by achieved by having the non-native application stub 34 invoke a down call to the trusted module 40 to execute the native code function(s) 36. Execution dependencies can occur at various places within the non-native application stub 34 and/or the native code function(s) and can be triggered at any appropriate stage. Rules regarding how, when, and where dependencies are created, triggered, and executed can be defined at build-time by using configuration control, and individualized at provisioning time. The original functionality of the non-native application 32 is preserved through the execution dependencies of the non-native application stub 34 on the native code function(s) 36.

Figure 5:
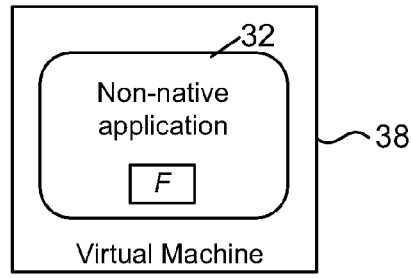
FIG. 5 shows a function in a non-native application.

FIG. 5 shows a non-native application 32 loaded into a virtual machine 38. The non-native application 32 has a non-native code function F, which will be used in the following examples of dynamic loading and bridge execution, trusted function execution, and trusted function invoking. As will be understood by the skilled worker, in some embodiments of the present disclosure, aspects of dynamic loading and bridge execution, trusted function execution, and trusted function invoking can be combined.

Figure 6:
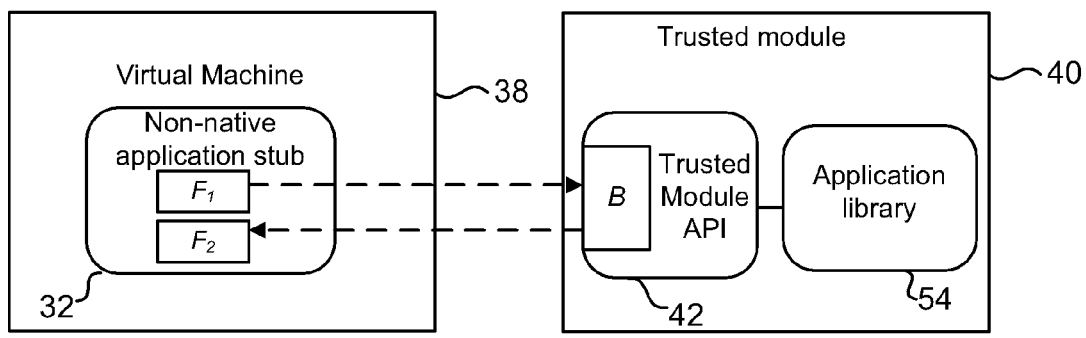
FIG. 6 shows a runtime representation of an example of partial execution using dynamic loading and bridge execution in accordance with the present disclosure.
Figure 7:
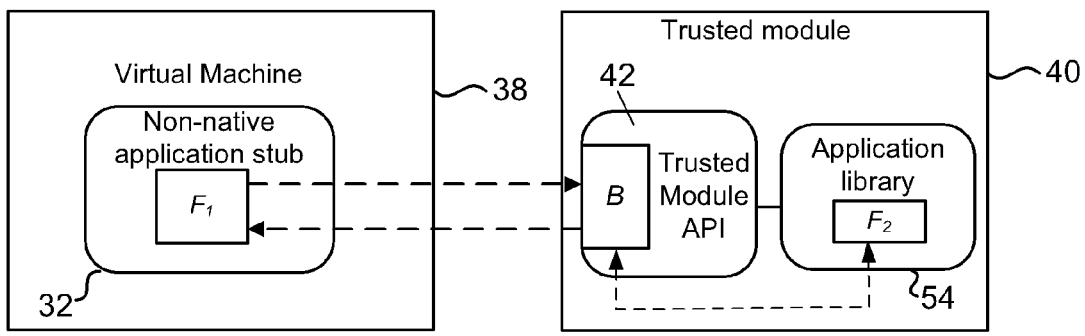
FIG. 7 shows a runtime representation of another example of partial execution using dynamic loading and bridge execution in accordance with the present disclosure.

FIG. 6 shows an example of dynamic loading and bridge execution. At the time of modifying the non-native application 32, the function F of the non-native application 32 can be modified to obtain any number of partial non-native code functions, for example, two partial non-native functions $F_1$ and $F_2$, and any number of native code functions, for example, one native code function B. The non-native code functions $F_1$ and $F_2$ can be installed in the non-native application stub 34, and the native code function B can be installed in the trusted module 40 (in the trusted module API 42). Alternatively, as shown in FIG. 7, the non-native code function $F_1$ can be installed in the non-native application stub 32, and the non-native code function $F_2$ can be installed in the application library 54. In either of the examples of FIGS. 6 and 7, the native code function B can be made part of the trusted module API 42 (trusted module 40). The native code function B is a bridging function (interfacing function) between $F_1$ and $F_2$. In the examples of FIGS. 6 and 7, an original execution dependency of function F is replaced by new execution dependencies: from $F_1$ to B to $F_2$. That is, $F_1$ makes a call to function B, which makes a call to function $F_2$. As B is an execution bridge between $F_1$ and $F_2$, without executing B, execution of $F_1$ or $F_2$ can only result in partial functionality of F. $F_1$ requires B to get to $F_2$ and does not have necessary information or ability to transfer the execution directly from $F_1$ to $F_2$. As such, F is replaced by new partial non-native functions $F_1$ and $F_2$ that have an execution dependency provided by the bridge function B. The bridged non-native functions $F_1$ and $F_2$ have a functionality equivalent to that of the non-native function F of the non-native application 32.

At application runtime, a call the partial non-native function $F_1$ will invoke a call to B via the trusted module 40. If $F_2$ is within the application stub 204 (example of FIG. 6), B will transfer execution from B to $F_2$. If the partial non-native function $F_2$ is within the application library 54 (example of FIG. 7), B will dynamically retrieve the partial non-native function $F_2$ using a native execution mechanism. Once the partial non-native function $F_2$ is loaded into the virtual machine 38, the non-native code function $F_2$ can be invoked by the native-code function B, which is in the trusted module 40. A return value from $F_2$ can then be proxied back, by B, to the partial non-native code function $F_1$.

Figure 8:
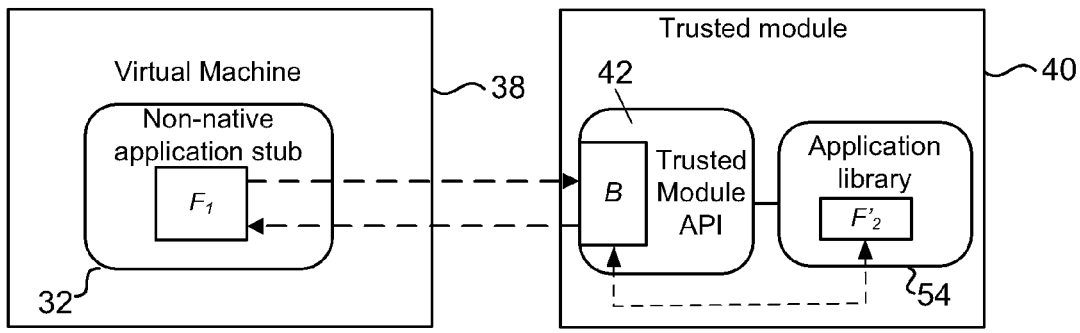
FIG. 8 shows a runtime representation of an example of partial execution using trusted function and bridge execution in accordance with the present disclosure.

FIG. 8 shows an example of interlocking with trusted function execution. At the time of modifying the non-native application 32 (shown at FIG. 5), the function F of the non-native application 32 can be modified to obtain any number of partial non-native code functions, for example, one partial non-native function $F_1$, and any number of native code functions, for example, a partial native code function $F'_2$, and a native code function B (bridge function). $F_1$ and $F'_2$ can be complementary in the sense of $F_1$ and $F_2$ (examples of FIGS. 6 and 7) being complementary. As an example, the partial native code function $F'_2$ can be the native code equivalent of the partial non-native code function $F_2$.

The partial non-native code function $F_1$ can be installed in the non-native application stub 32, the partial native code function $F'_2$ can be installed in the application library 54, and the native code function B can be installed in the trusted module API 42. In the example of FIG. 8, the original execution dependency of the function F is replaced by a new execution dependency from $F_1$ to B to $F'_2$. That is, $F_1$ makes a call to function B, which makes a call to function $F'_2$. B is an execution bridge between $F_1$ and $F'_2$. $F'_2$ and B are in the trusted module 40. The bridged functions $F_1$ and $F'_2$ have a functionality equivalent to that of the non-native function F of the non-native application 32.

The non-native function F has been replaced by a partial non-native code function $F_1$, a partial native code function $F'_2$, and bridging native code function B. Without executing B and $F'_2$, the execution of $F_1$ is only a partial execution, and $F_1$ does not have necessary information and ability to transfer the execution directly from $F_1$ to $F'_2$.

At Application runtime, a call to $F_1$ invokes a call to B via the trusted module 40, which executes function $F'_2$ within the context of the trusted module 40. $F'_2$ is a native code function which can have the partial (or complete) functionality of the non-native function F. A function return value from $F'_2$ can be passed back to $F_1$ function from the $F'_2$ function call through the native code function B.

Figure 9:
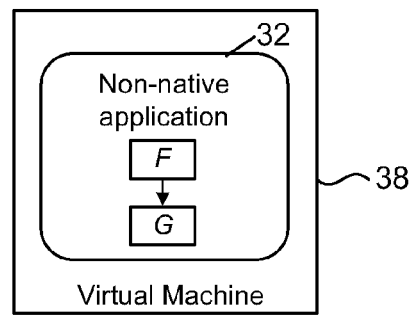
FIG. 9 shows two functions in a non-native application.

FIG. 9 shows an example where a non-native application 32 loaded into a virtual machine 38 has non-native code function F and G, with the function G requiring an input from the function F.

Figure 10:
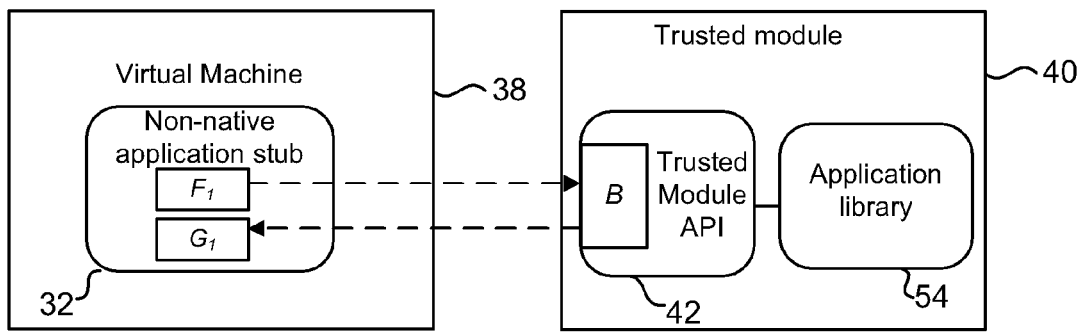
FIG. 10 shows a runtime representation of an example of trusted function invocation in accordance with the present disclosure.

FIG. 10 shows an example of interlocking with trusted function invocation. At the time of modifying the non-native application 32, which, in the present example includes non-native code functions F and G, the function F is modified to obtain a non-native code function $F_1$ and, the function G is modified to obtain a non-native code function $G_1$. Additionally, a native code function B (bridge function) is obtained. $F_1$ and $G_1$ are installed in the non-native application stub 32, the native code function B is installed in the trusted module API 42. $F_1$ and $G_1$ are such that the invoking relationship between F and G in the non-native application 32 is replaced by an invocation from $F_1$ to B to $G_1$. That is, $F_1$ makes a call to function B, which makes a call to function $G_1$. Without executing from $F_1$ to B, $G_1$ will not be executed.

The bridged functions $F_1$ and $G_1$ have a functionality equivalent to that of the functions F and G of the non-native application 32.

At Application runtime, a call to function $F_1$ invokes a down call B to the trusted module 40, the trusted module 40 then invokes an up-call to execute function $G_1$. A function return value may be passed back to $F_1$ from $G_1$ function call via the native function B in the trusted module 40.

Once a non-native application has been locked to a trusted module 40 using one or more of the above locking methods, additional security techniques can be applied. Security techniques can be based, for example, on the type of virtual machine, and on the non-native applications.

Examples of dynamic loading and bridge execution, trusted function execution, and trusted function invoking, are described below in the context of the non-native application being coded in Java source code.

Java source code is normally compiled to a byte level code for deployment and execution in a Java virtual machine. The specifications of Java byte code are standardized and are used by Java virtual machine implementers. There are existing open source and commercial tools that have features for modifying java byte code.

In some embodiments of the present disclosure, a Java implementation of the interlocking tool 30 of FIG. 2 would need to modify the Java application prior to deployment. The interlocking tool 30 may be capable of modifying Java byte code and or Java source code, and implementing these capabilities would be an option available to the interlocking tool provider, as one of ordinary skill in the art will appreciate.

Java has features that allow Java to call native modules. This bridge mechanism between Java and native code is called the Java Native Interface, which supports calling native C code. The Java Native Interface bridge enables down-calls (Java calling native code) and up-calls (native code calling Java code running within the Java virtual machine runtime environment). Using the Java Native Interface can allow implementation of the partial execution techniques disclosed above.

For a dynamic loading and bridge execution technique (examples at FIGS. 6 and 7), the non-native code of the non-native application can be modified by changing existing functions (or classes, class methods), and replacing with calls to a trusted module 40 via the Java Native Interface bridge. During runtime execution, the call to the trusted module 40 is invoked, and the trusted module 40 can load the function byte code from the trusted module security context, into the Java virtual machine and execute it, via the Java Native Interface bridge.

The features of the Java Native Interface bridge can also allow for implementation of the Trusted Function Execution technique (example of FIG. 8). The Interlocking tool 30 (shown at FIG. 3) would analyze the Java source code (or byte code) of the Java application, and would replace function code with calls to the trusted module 40, which execute equivalent functionality within the context of the trusted module 40.

The Java Native Interface mechanism is also applicable for Trusted Function Invocation (example of FIG. 10). Calls to nested functions within functions are replaced with calls to a trusted module 40, as determined by the Interlocking tool 30 when applied to the Java source code (or byte code). During runtime, the Java Native Interface bridge enables the trusted module 40 to be invoked, which in turn determines the appropriate function to invoke, the trusted module 40 would then execute an up-call to the Java virtual machine, calling the nested function along with associated arguments etc.

As such, the Java Native Interface is an example of a mechanism that can enable the non-native application stub to call the native code function B in the examples described herein.

Web applications provide a user interface that is run within a web browser, for presentation and user interaction. Web applications are typically comprised of pages that have HTML and JavaScript functions that are delivered to a web browser, which interprets the HTML page, and transforms the page into an internal Document Object Model representation. Web browsers are software applications and most provide a bridge mechanism enabling web applications to call native code modules, and also enable native code modules to access internal web applications. A common bridge mechanism (or web browser plugin interface) is the Netscape Plugin Application Programming Interface (NPAPI) used in Firefox™, Google Chrome™, Safari™, Opera™ web browsers. The NPAPI allows web applications to invoke down calls to a native module and also allow native modules to invoke up-calls to the web browser application runtime environment. This NPAPI bridge mechanism can be used to enable the partial execution techniques disclosed herein.

For certain embodiments of the Dynamic loading and bridge execution technique, the source HTML and JavaScript functions can be modified, changing existing functions, and replacing with calls to the trusted module 40 via the NPAPI bridge. During runtime execution, the call to the trusted module 40 is invoked, and the trusted module 40 can load, for example, JavaScript function code from the trusted module 40 security context, into the web application runtime environment and execute it, via the NPAPI bridge.

The features of the NPAPI bridge in supported web browsers also allow for implementation of the Trusted Function Execution technique. The Interlocking tool 30 (shown at FIG. 2) can analyze the web application source code replacing JavaScript function code with calls to the trusted module 40, which execute equivalent functionality within the context of the trusted module 40.

The same mechanism may also be applicable for Trusted Function Invocation (example of FIG. 10) in that calls to nested JavaScript function within functions can be replaced by calls to the trusted module 40, as determined by the Interlocking tool 30 when applied to the web application source. During runtime, the NPAPI bridge enables the trusted module 40 to be invoked, which in turn would determine the appropriate function to invoke, the trusted module 40 would then execute an up-call to the web application, calling the nested JavaScript function along with associated arguments etc.

In absence of interlocking to a trusted module, when implementing a secure loader in a non-native execution environment, the application calling a trusted module to securely load the application can potentially be spoofed. That is, a rogue application could impersonate the original calling application initiating the secure loader. By interlocking the application with a trusted module, the calling application can be authenticated and verified by the trusted module. Without the interlocked trusted module, the application would fail to load. Examples of secure loading mechanisms can be found in International Patent Application Publication Number WO 2010/1247438, and in International Patent Application Number CA2010/001761.

Again, in absence of interlocking, when applying integrity verification techniques, possible security attacks could involve replacing the virtual machine or application with a rogue implementation in order to bypass integrity verification checks during runtime. By interlocking the application with a trusted module, the calling application and or virtual machine can be authenticated and verified by the trusted module at start up and also during runtime. Without the interlocked trusted module, the application would fail to start and or execute.

Additional security functions can be added to the interlocking execution techniques described above in relation to the examples of FIGS. 6, 7, 8, and 10, to deter security breaches such as those described below. For example, the application security module 52 (shown at FIG. 4) can support security functions, such as the following. A) Secure loading of an application, which can prevent reverse engineering attacks to the application; B) Integrity verification of an application, which can prevent static and dynamic tampering attacks to the application; C) Debug prevention of an application, which can prevent dynamic attacks using attack tools such as a debug or simulator; and, D) Dynamic encryption of an application, which can prevent static tampering and dynamic code lifting attacks. The security functions A-D are provided as examples only, and one of ordinary skill in the art will appreciate that other functions may be equally supported. Examples of security functions A-D are provided below.

In addition to security functions such as security functions A-D, the security module 52 can export trusted module discovery primitives and similar communication primitives to enable multiple virtual machines to use the trusted module (even simultaneously). As the trusted module 40 is a native application, it can use all security functions provided by the computing platform. The trusted module provides an abstraction of these security features to the virtual machine and/or the script engine. As a separate module, the trusted module 40 can be replaced independently from the virtual machine and the script engine. This makes it possible to separate application trust management and the feature set provided by the virtual machine.

Figure 11:
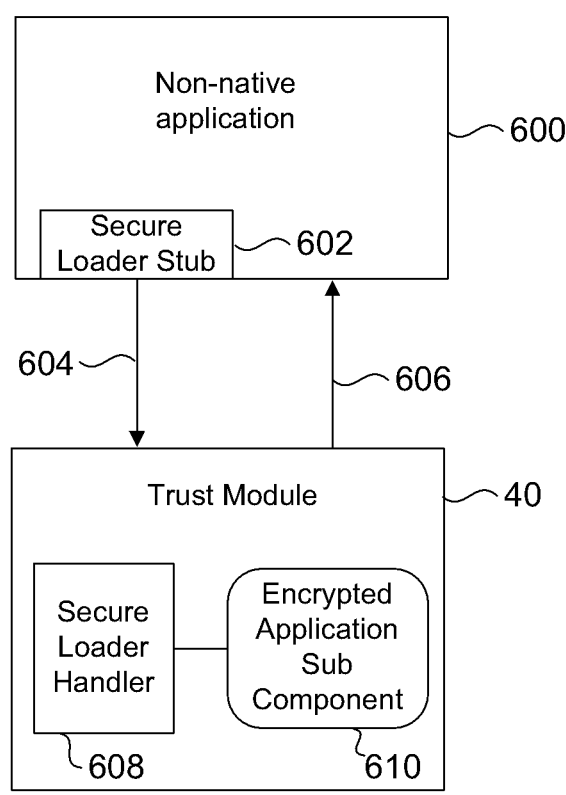
FIG. 11 shows an embodiment of the present disclosure featuring secure loading.

Securely loading of a non-native application can be used to prevent static analysis type attacks on the application and its related data before it is executed. FIG. 11 shows an example of how the secure loader functionality can be extended to a scripting language environment (or a virtual machine execution environment) by adding a trusted module 40.

Prior to the deployment of non-native application 600, a secure loader pre-provisioning step occurs where the non-native application sub-components (e.g., a function, a classe, a module) are identified and encrypted and stored as a secured resource(s) for input into the secure loader start-up step. These resources are encrypted so that only the trusted add-on module is able to decrypt the resources.

Integration of a Secure Loader Stub 602 into the non-native application 600 is required in order to define the trigger point for initiating the secure loading of the non-native application sub-components into the application runtime from the trusted module 40. The Secure Loader stub 602 is a non-native application sub-component that is able to invoke secure loader function(s) of the trusted module 40. Subsequently, the non-native application 600 along with the trusted module 40 and the encrypted sub components are deployed.

At application start-up time, the secure loader stub 602 is triggered by the application 600. This trigger calls the secure loader stub 602, which in turn invokes a down call 604 to the trusted module 40, signaling it to load application sub-component(s).

The trusted module 40 authenticates a request from the secure loader stub 602 component and invokes the secure loader handler 608, which is a native code function. If the trusted module 40 is unable to authenticate the calling application, the application 600 fails to load.

The trusted module 40 identifies the application sub-components and decrypts the application sub-component. Once the trusted module 40 has decrypted an application sub-component, it then places an up call 606 to the application runtime, loading the application sub-component into the application context.

The decrypted application sub-component is now available to the non-native application context. Once completed, the trusted module 40 may optionally return a status result the secure loader stub 602 down call method invocation.

Figure 12:
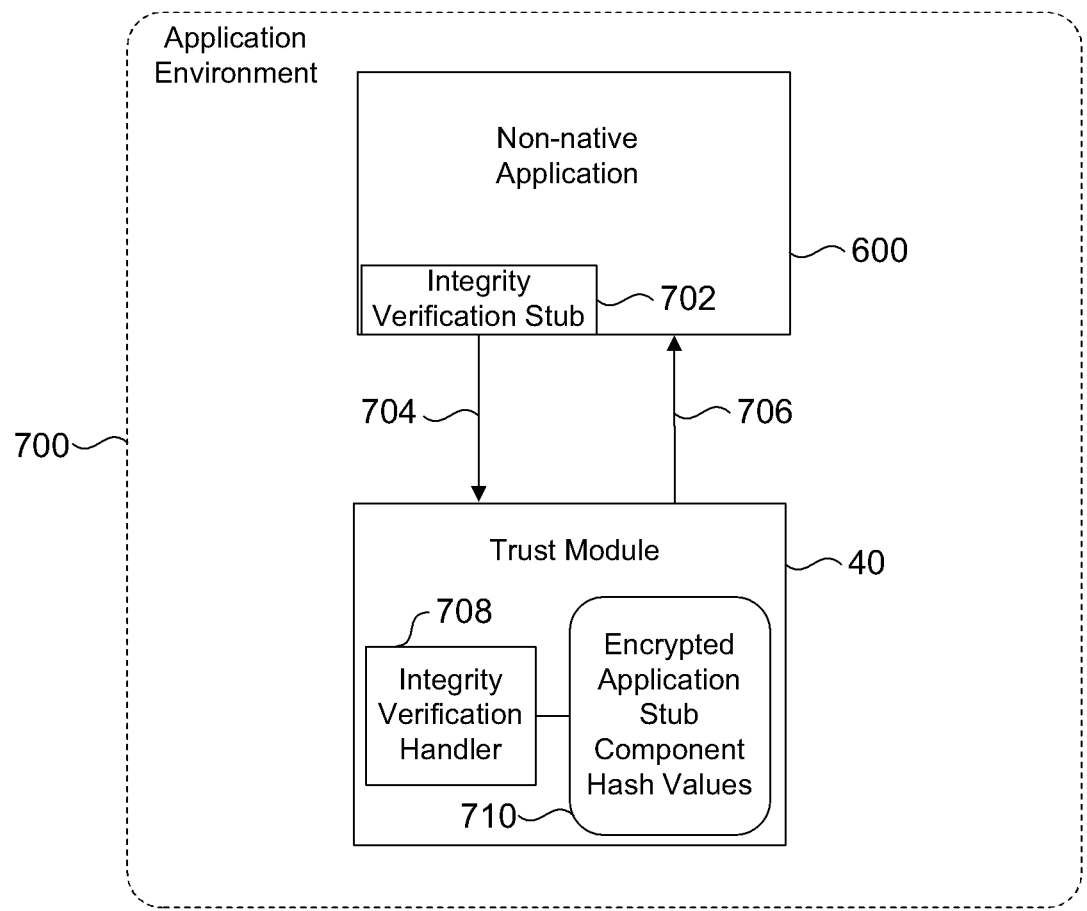
FIG. 12 shows an embodiment of the present disclosure featuring secure integrity verification.

Integrity verification can validate that the non-native application has not been tampered with. FIG. 12 shows an exemplary process for integrity verification in accordance with an embodiment of the present disclosure:

Prior to the deployment of non-native application 600, an integrity verification pre-provisioning step occurs where the application sub-components are identified for integrity verification purposes. During this step, a cryptographic hash value is calculated on each sub-component. The sub-component hash values 710 (e.g., SHA-1) are encrypted such that only the trusted module 40 is able to retrieve and decrypt the values.

During the pre-provisioning step, prior to the hash calculation step, integrity verification trigger points are defined in the non-native application 600. Integrity verification trigger points are defined in an Integrity Verification Stub 702, which in turn makes a down call to the trusted module 40. Optionally, integrity verification trigger points can be integrated with business logic, such that a down call 704 is required during application runtime in order to invoke some business logic (linked with the trusted module 40), which in turn may invoke a integrity verification check.

Subsequently, the non-native application 600, the trusted module 40 and the encrypted hash values 710 are deployed. At application startup or during runtime, as determined by the integrity trigger points, the integrity verification stub 702 is invoked by the non-native application 600. The integrity verification stub 702 invokes a down call 704 to the trusted module 40 signaling an integrity verification check to run. The integrity verification stub 702 may pass application context information to the trusted module 40, to be utilized by the trusted module 40 for integrity verification.

Following this, the trusted module 40 authenticates a request from the integrity verification stub 702 component and invokes the integrity verification handler 708, which is a native code function. If the trusted module 40 is unable to authenticate the calling application, the non-native application 600 can invoke some application specific failure policy.

Subsequently, the trusted module 40 identifies the application sub-components from the non-native application context information passed to it and decrypts the internal application sub-components hash value(s) 710.

The trusted module 40 performs a dynamic integrity verification comparison check of the application sub-component by placing an up call to the application 600 and retrieving the in-memory sub-component representation. The trusted module 40 then calculates the hash value of the in-memory subcomponent and compares with the decrypted hash value deployed with the application.

If the integrity verification comparison check fails, the trusted module 40 may fail the non-native application 600, using failure policy that is determined during the application pre-provisioning step.

Once completed the trusted module 104 may optionally return a status result the integrity verification stub 702 down call method invocation.

Figure 13:
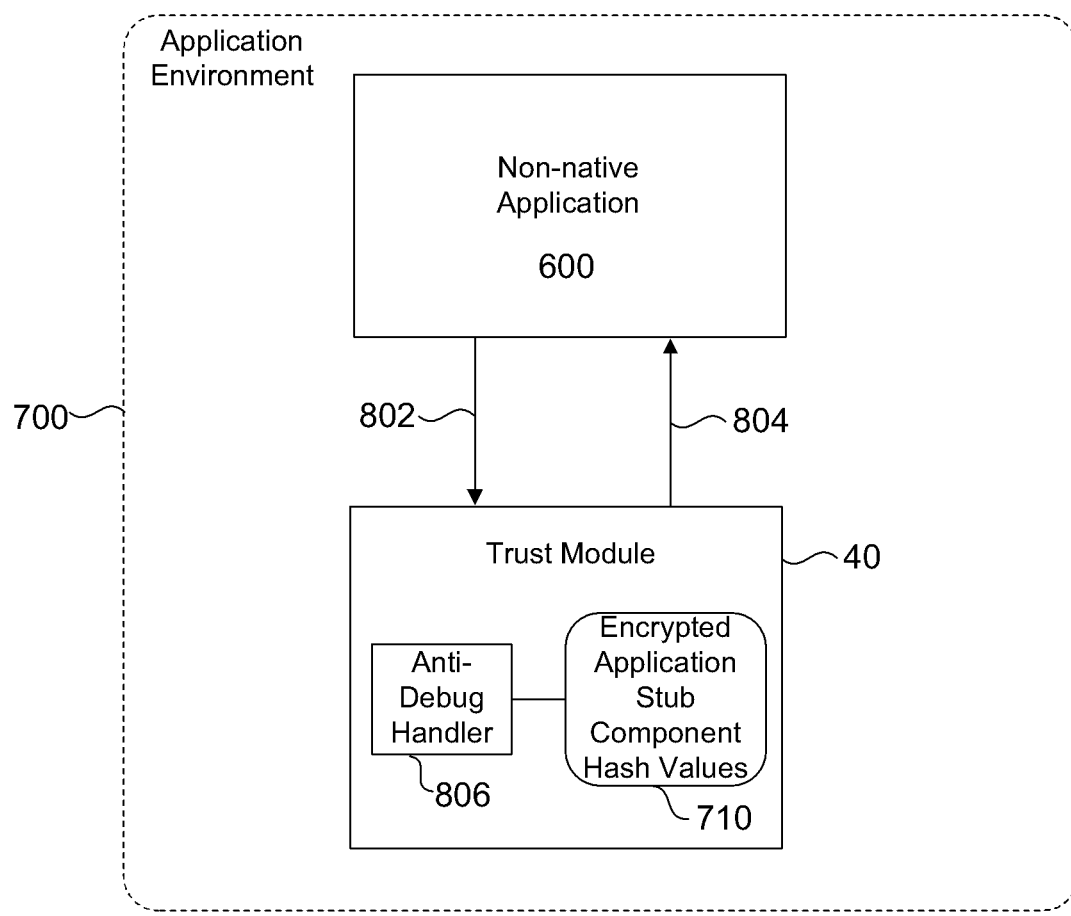
FIG. 13 shows an embodiment of the present disclosure featuring an anti-debugging feature.

FIG. 13 shows an exemplary process for anti-debug according to an embodiment of the present disclosure. The process includes the following.

Prior to the deployment of the non-native application 600, an anti-debug policy is defined for the non-native application 600. The policy is enabled by the trusted module 40 and can be triggered in various ways, for example: a) By designated down-calls; b) By designated integrity verification checks; and, c) By designated secure loader calls, all of which can be made part of a non-native application stub associated to the non-native application 600.

During the non-native application execution, an anti-debug check can be triggered and launched from within the trusted module 104. An anti-debug handler 806 within the trusted module 40 is invoked to perform anti-debug platform and language specific checks such as: a) Time based anti-debug; b) Exception based anti-debug; and, c) Application runtime specific checks.

The present disclosure discusses the deployment of a Trusted Module that can secure virtual machine applications. As one of ordinary skill in the art will appreciate, a single trusted module can service more than one VM. Further, the present disclosure may be relevant to a wide range of widely used computing platforms.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A method to secure execution of a non-native application coded in non-native code, the method comprising:
   modifying the non-native application prior to execution to generate a native code function and an application stub, the native code function being executable within a predefined trusted module, the pre-defined trusted module having one or more native environment security functions, the application stub having at least one execution dependency dependent on the native code function; and
   packaging the application stub with the native code function in a manner permitting execution in a non-native environment, wherein execution in a non-native environment includes loading the application stub within a non-native environment, loading the native code function within the pre-defined trusted module, and the application stub calling the native code function, wherein the native code function is executed within the pre-defined trusted module in accordance with at least one of the one or more native environment security functions;
   wherein at least one non-native function in the application stub is configured to call the native code function upon execution of the application stub.

2. The method of claim 1 further comprising executing the application stub in a non-native environment.

3. The method of claim 1 wherein:
   the non-native application includes a non-native code function; and
   modifying the non-native application includes converting the non-native code function into a counterpart native code function.

4. The method of claim 1 wherein:
   the application includes a non-native code function with a non-native code function functionality;
   modifying the non-native application includes converting the non-native code function into partial non-native code functions, and installing the partial non-native code functions in the application stub; and
   the native code function includes one or more bridge functions to bridge the partial non-native code functions to obtain bridged partial non-native code functions, the bridged partial non-native code functions having a functionality equivalent to that of the non-native code function.

5. The method of claim 1 wherein:
   the non-native application includes a non-native code function with a non-native code function functionality;
   modifying the non-native application includes converting the non-native code function into partial non-native code functions, installing a first portion of the partial non-native code functions in the application stub, and
   installing a second portion of the partial non-native code functions in an application library, the application library being encompassed within the predefined trusted module; and
   the native code function includes one or more bridge functions to bridge the first and second portions of the partial non-native code functions to obtain bridged partial non-native code functions, the bridged partial non-native code functions having a functionality equivalent to that of the non-native code function.

6. The method of claim 1 wherein:
   the non-native application includes a non-native code function with a non-native code function functionality;

modifying the non-native application includes converting the non-native code function into at least one partial non-native code function and at least one partial native code function, the at least one partial non-native code function being part of the application stub; and the native code function includes one or more bridge functions to bridge the at least one partial non-native code function and the at least one partial native code function to obtain bridged partial native and non-native code functions, the bridged partial native and non-native code functions having a functionality equivalent to that of the non-native code function.

7. The method of claim 1 wherein:
the non-native application includes a plurality of non-native code functions having an overall functionality;
modifying the non-native application includes installing the plurality of non-native code functions in the application stub; and
the native code function includes one or more bridge functions to bridge the plurality of non-native code functions to obtain bridged non-native code functions, the bridged non-native code functions having a functionality equivalent to that of the overall functionality of the plurality of non-native code functions.

8. The method of claim 1 wherein the application stub includes a secure loader stub and the one or more native environment security functions include a secure loader handler function.

9. The method of claim 1 wherein the application stub includes an integrity verification stub and the one or more native environment security functions include an integrity verification handler function.

10. The method of claim 1 wherein the one or more native environment security functions include an anti-debug handler.

11. The method of claim 1 wherein:
the non-native application includes a non-native code function with a non-native code function functionality; and
modifying the non-native application includes:
converting the non-native code function into partial non-native code functions, the partial non-native code functions having a first portion of the partial non-native code functions and a second portion of the partial non-native code functions; and
installing the first portion of the partial non-native code functions in the application stub;
the method further comprising:
encrypting the second portion of the partial non-native code functions to obtain encrypted partial non-native code functions; and
installing the encrypted partial non-native code functions in an application library, the application library being encompassed within the pre-defined trusted module, the
encrypted partial non-native code functions to be decrypted at run-time to obtain a decrypted second portion of the partial non-native code functions, the decrypted second portion of the partial non-native code functions to be loaded in the non-native environment, the native code function including one or more bridge functions to bridge the first portion of the partial non-native code functions and the decrypted second portion of the partial non-native code functions to obtain bridged partial non-native code functions, the bridged partial non-native code functions having a functionality equivalent to that of the non-native code function.

12. A tangible, non-transitory computer-readable medium containing instructions, which when executed by a processor cause the processor to perform a method to secure execution of a non-native application coded in non-native code, the method comprising:
modifying the non-native application prior to execution to generate a native code function and an application stub, the native code function being executable within a predefined trusted module, the pre-defined trusted module having one or more native environment security functions, the application stub having at least one execution dependency dependent on the native code function; and
packaging the application stub with the native code function in a manner permitting execution in a non-native environment, wherein execution in a non-native environment includes loading the application stub within a non-native environment, loading the native code function within the pre-defined trusted module, and the application stub calling the native code function, wherein the native code function is executed within the pre-defined trusted module in accordance with at least one of the one or more native environment security functions;
wherein at least one non-native function in the application stub is configured to call the native code function upon execution of the application stub.

13. The computer-readable medium of claim 12 wherein the method further comprises executing the application stub in a non-native environment.

14. The computer-readable medium of claim 12 wherein:
the non-native application includes a non-native code function; and
modifying the non-native application includes converting the non-native code function into a counterpart native code function.

15. The computer-readable medium of claim 12 wherein:
the non-native application includes a non-native code function with a non-native code function functionality;
modifying the non-native application includes converting the non-native code function into partial non-native code functions, and installing the partial non-native code functions in the application stub; and
the native code function includes one or more bridge functions to bridge the partial non-native code functions to obtain bridged partial non-native code functions, the bridged partial non-native code functions having a functionality equivalent to that of the non-native code function.

16. The computer-readable medium of claim 12 wherein:
the non-native application includes a non-native code function with a non-native code function functionality;
modifying the non-native application includes converting the non-native code function into partial non-native code functions, installing a first portion of the partial non-native code functions in the application stub, and installing a second portion of the partial non-native code functions in an application library, the application library being encompassed within the predefined trusted module; and
the native code function includes one or more bridge functions to bridge the first and second portions of the partial non-native code functions to obtain bridged partial non-native code functions, the bridged partial non-native code functions having a functionality equivalent to that of the non-native code function.

17. The computer-readable medium of claim 12 wherein:
the non-native application includes a non-native code function with a non-native code function functionality;
modifying the non-native application includes converting the non-native code function into at least one partial non-native code function and at least one partial native code function, the at least one partial non-native code function being part of the application stub; and
the native code function includes one or more bridge functions to bridge the at least one partial non-native code function and the at least one partial native code function to obtain bridged partial native and non-native code functions, the bridged partial native and non-native code functions having a functionality equivalent to that of the non-native code function.

18. The computer-readable medium of claim 12 wherein:
the non-native application includes a plurality of non-native code functions having an overall functionality;
modifying the non-native application includes installing the plurality of non-native code functions in the application stub; and
the native code function includes one or more bridge functions to bridge the plurality of non-native code functions to obtain bridged non-native code functions, the bridged non-native code functions having a functionality equivalent to that of the overall functionality of the plurality of non-native code functions.

19. The computer-readable medium of claim 12 wherein the application stub includes a secure loader stub and the one or more native environment security functions include a secure loader handler function.

20. The computer-readable medium of claim 12 wherein the application stub includes an integrity verification stub and the one or more native environment security functions include an integrity verification handler function.

21. The computer-readable medium of claim 12 wherein the one or more native environment security functions include an anti-debug handler.

22. The computer-readable medium of claim 12 wherein:
the non-native application includes a non-native code function with a non-native code function functionality;
modifying the non-native application includes:
converting the non-native code function into partial non-native code functions, the partial non-native code functions having a first portion of the partial non-native code functions and a second portion of the partial non-native code functions; and
installing the first portion of the partial non-native code functions in the application stub; and
the method further comprises:
encrypting the second portion of the partial non-native code functions to obtain encrypted partial non-native code functions; and
installing the encrypted partial non-native code functions in an application library, the application library being encompassed within the pre-defined trusted module, the encrypted partial non-native code functions to be decrypted at run-time to obtain a decrypted second portion of the partial non-native code functions, the decrypted second portion of the partial non-native code to be loaded in the non-native environment, the native code function including one or more bridge functions to bridge the first portion of the partial non-native code functions and the decrypted second portion of the partial non-native code functions to obtain bridged partial non-native code functions, the bridged partial non-native code functions having a functionality equivalent to that of the non-native code function.

* * * * *